(12) United States Patent
Tournerie

(10) Patent No.: US 11,174,830 B2
(45) Date of Patent: Nov. 16, 2021

(54) FLOATING WAVE ENERGY DEVICE

(71) Applicant: SEATURNS, Bordeaux (FR)

(72) Inventor: Vincent Tournerie, Bordeaux (FR)

(73) Assignee: SEATURNS, Bordeaux (FR)

( * ) Notice: Subject to any disclaimer, the term of this patent is extended or adjusted under 35 U.S.C. 154(b) by 0 days.

(21) Appl. No.: 16/758,211

(22) PCT Filed: Oct. 25, 2018

(86) PCT No.: PCT/EP2018/079321
§ 371 (c)(1),
(2) Date: Apr. 22, 2020

(87) PCT Pub. No.: WO2019/081659
PCT Pub. Date: May 2, 2019

(65) Prior Publication Data
US 2020/0284236 A1    Sep. 10, 2020

(30) Foreign Application Priority Data

Oct. 26, 2017   (FR) ...................................... 1771127

(51) Int. Cl.
| | | |
|---|---|---|
| *F03B 13/18* | (2006.01) | |
| *B63B 22/04* | (2006.01) | |
| *F03B 13/20* | (2006.01) | |

(52) U.S. Cl.
CPC .............. *F03B 13/18* (2013.01); *B63B 22/04* (2013.01); *F03B 13/20* (2013.01)

(58) Field of Classification Search
CPC ........ F03B 13/18; F03B 13/20; F03B 13/181; B63B 22/04; Y02E 10/30; F05B 2250/231

USPC ........................ 60/497–499, 504; 290/42, 53
See application file for complete search history.

(56) References Cited

U.S. PATENT DOCUMENTS

| | | | |
|---|---|---|---|
| 8,113,964 B2 | 2/2012 | Lindsay | |
| 2006/0214050 A1 | 9/2006 | Naeckel | |
| 2007/0089409 A1 | 4/2007 | Serrano Molina | |
| 2010/0107627 A1* | 5/2010 | Morgan .............. | F03B 13/1885 60/495 |
| 2011/0018275 A1* | 1/2011 | Sidenmark .......... | F03B 13/1815 290/53 |
| 2012/0292911 A1* | 11/2012 | Bolin .................... | F03B 17/061 290/54 |
| 2016/0265506 A1* | 9/2016 | Kimura ............... | F03B 13/1845 |
| 2018/0372061 A1* | 12/2018 | Vamvas ................. | B63B 35/44 |
| 2019/0145373 A1* | 5/2019 | Lehmann ............... | F03B 13/20 290/53 |

FOREIGN PATENT DOCUMENTS

| | | |
|---|---|---|
| WO | 2008038005 A1 | 4/2008 |
| WO | 2015144956 A1 | 10/2015 |

OTHER PUBLICATIONS

International Search Report; priority document.

* cited by examiner

*Primary Examiner* — Hoang M Nguyen
(74) *Attorney, Agent, or Firm* — Greer, Burns & Crain, Ltd.

(57) ABSTRACT

A floating wave energy converter intended to be installed in an aquatic environment comprising a surface, water and a bed, realized by a cylinder including an energy-production device, and connectors connected to anchors, wherein the connectors intersect.

17 Claims, 3 Drawing Sheets

US 11,174,830 B2

FLOATING WAVE ENERGY DEVICE

CROSS-REFERENCES TO RELATED APPLICATIONS

This application claims the benefit of the French patent application No. 1771127, filed on Oct. 26, 2017, and of the International patent application No. PCT/EP2018/079321 filed on Oct. 25, 2018, the entire disclosures of which are incorporated herein by way of reference.

BACKGROUND OF THE INVENTION

Given global warming, the use of renewable energies is a necessity, with marine renewable energies offering considerable energy potential, especially wave energy.

Oscillating water column devices and surge devices are known, but all of these devices have several drawbacks. Indeed, there are problems of aging and sizing related to the connections and to the mechanical joints in the case of articulated devices. In addition, these devices are very bulky and require safety oversizing.

Devices for recovering wave energy are also known. Some of these are floating devices which transform the movements of the floating generator, induced by the swell, into energy. Indeed, the swell generates vertical movements of this floating generator which can be converted into electrical energy, via energy-production means which can be internal or external to the floating device, or via rotational-drive means making it possible to generate current.

However, most of the known floating electrical energy generation devices are connected to an anchor positioned at the bottom of the water via a direct connection. Depending on the climatic conditions, i.e., the tides, the buoyancy, swell and wave forces that can act on the floating device can be very significant, again requiring safety oversizing.

SUMMARY OF THE INVENTION

The present invention provides a floating energy generator of which the attachment to the anchor does not have to be direct, and of which the energy production is effected by the surge movement of the device on the water. More specifically, the present invention provides a floating wave energy converter intended to be installed in an aquatic environment comprising a surface S, water E and a bed F, the device being realized by a cylinder 10 comprising energy-production means, and connection means connected to anchors, wherein this device is characterized in that the connection means intersect in a specific manner.

BRIEF DESCRIPTION OF THE DRAWINGS

The present invention shall now be described according to a non-limiting main embodiment, with reference to the associated drawings in which the different figures show.

DETAILED DESCRIPTION OF THE PREFERRED EMBODIMENTS

Figure 1:
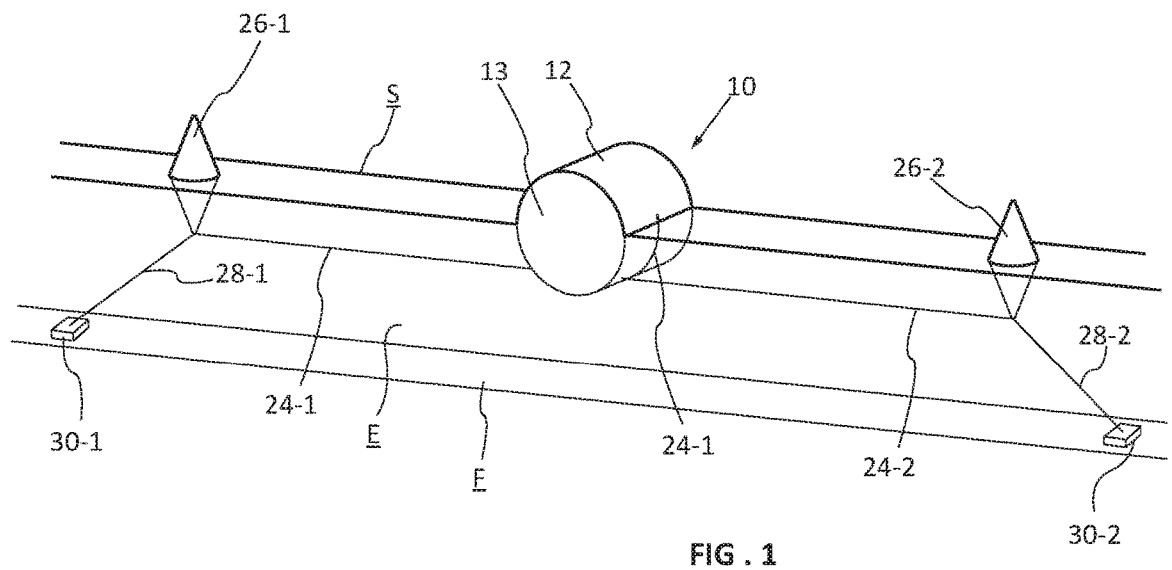
FIG. 1: a perspective view of the wave energy converter in its installation environment.
Figure 2:
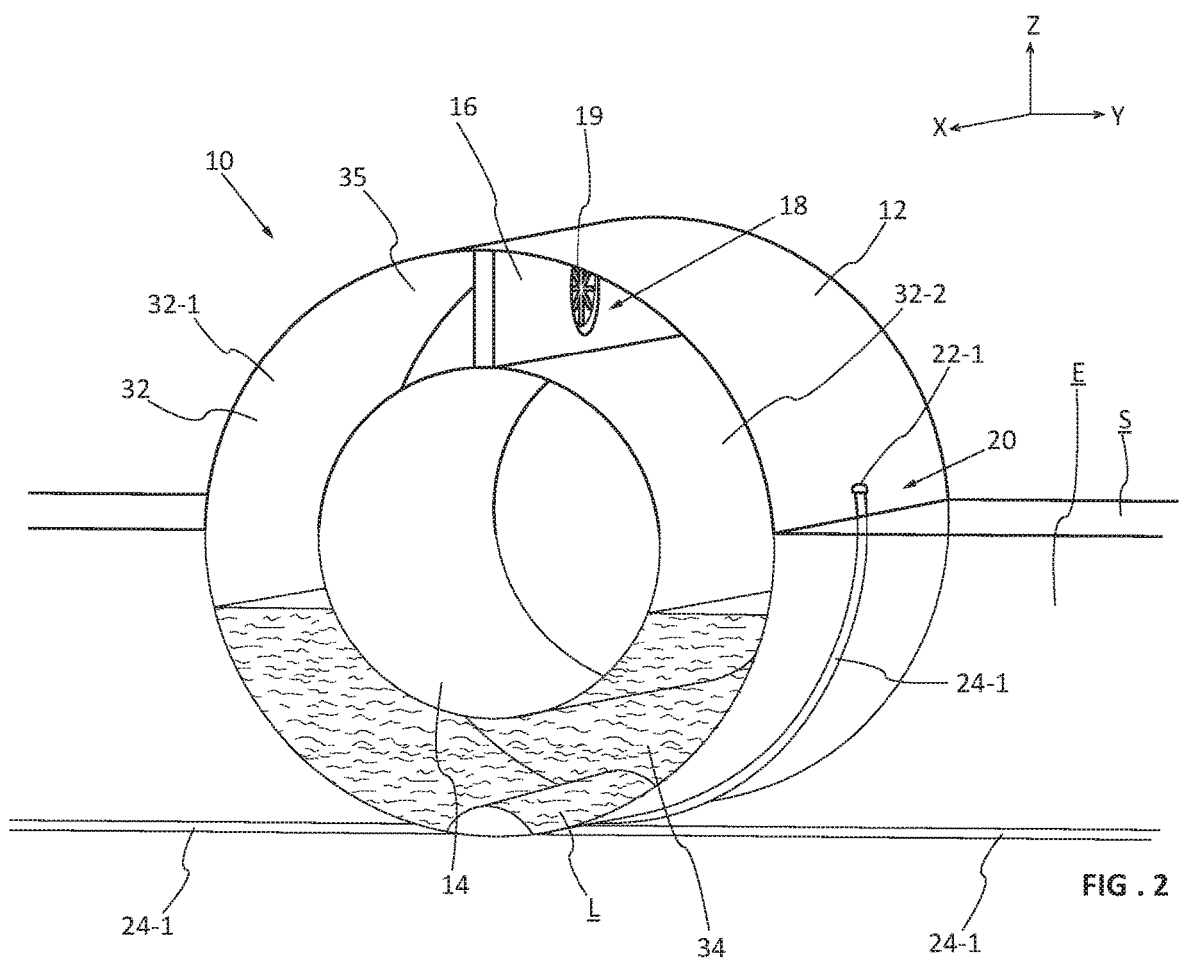
FIG. 2: a perspective view of the wave energy converter, seen in cross-section.

FIGS. 1 to 6 show the wave energy converter in an orthonormal frame of reference X, Y, Z. FIG. 2 is a cross-section of a perspective view and FIG. 1 is a perspective view of the wave energy converter placed in a marine space made up of water E, having a surface S and a seabed F.

The device according to the present invention is set up operationally in this space. The wave energy converter comprises a cylinder 10 extended along the X-axis, placed on the surface S of the water E and immersed to about half its volume.

As can be seen in FIGS. 1 and 2, the cylinder 10 has an outer cylindrical wall 12, two lateral walls 13 and an inner cylindrical wall 14 fixed to the outer wall 12 by at least one support partition 16. The at least one support partition 16, extended in the radial plane X, Z, comprises energy-production means 18, in this case a current generator 19.

The wave energy converter is also provided with connection means 20, realized by at least two fasteners 22-1 and 22-2 and two support cables 24-1 and 24-2. The fasteners 22-1 and 22-2 are secured to the outer wall 12 of the cylinder 10, and are connected to floating elements 26-1 and 26-2 via the support cables 24-1 and 24-2.

The floating elements 26-1 and 26-2 are moored to the bed F, in each case by at least one mooring cable 28-1 and 28-2, respectively connecting the floating elements 26-1 and 26-2 to anchors 30-1 and 30-2 placed on the bed F.

The fasteners 22-1 and 22-2 of the outer wall 12 of the cylinder 10 are placed symmetrically with respect to a horizontal plane, and these fasteners 22-1 and 22-2 are placed on the opposite side of the cylinder from the support cables 24-1 and 24-2. Thus, the support cables 24-1 and 24-2 intersect at a point C, located at the bottom of the cylinder 10, along the Z-axis and visible in FIGS. 4, 5 and 6. The cables 24-1 and 24-2 are also partially wound around the cylinder 10. The point C is for reference on the cylinder.

The two outer 12 and inner 14 walls of the cylinder 10 form an inner annular volume 32 which receives a liquid fluid 34, for example water, and a gaseous fluid 35, in this case air. In the lower part, the cylinder 10 also includes a ballast L, which can be placed inside, in the annular volume 32 or on the periphery of the cylinder 10, on the outside of the wall 12. Within the inner annular volume 32, two chambers, 32-1 and 32-2, are formed between the free surface of the liquid fluid 34 and the at least one support partition 16. The two chambers, 32-1 and 32-2, are therefore separated, on the one hand, by the support partition 16, and, on the other hand, by the liquid fluid 34.

If the cylinder 10 is shown with two simple fasteners 22-1 and 22-2, placed symmetrically with respect to a median plane extended along the plane X, Z passing through the center of the cylinder 10, it is necessary to consider that the wave energy converter is, in practice, connected by two pairs of support cables 241-1, 241-2 and 242-1, 242-2 which originate respectively from the support cables 24-12 and 24-22 and are connected to two pairs of fasteners (not shown) placed at the same height along the Z-axis on either side of the cylinder 10. The two support cables 24-12 and 24-22 can diverge simply, as shown in FIG. 3a, but can also include a spacer 25, as shown in FIG. 3b.

Figure 3A:
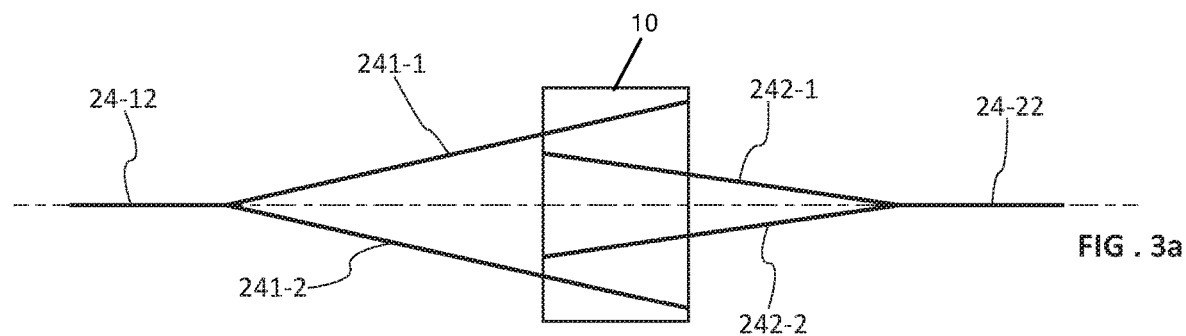
FIG. 3a: a bottom view of a variant of the connection means.
Figure 3B:
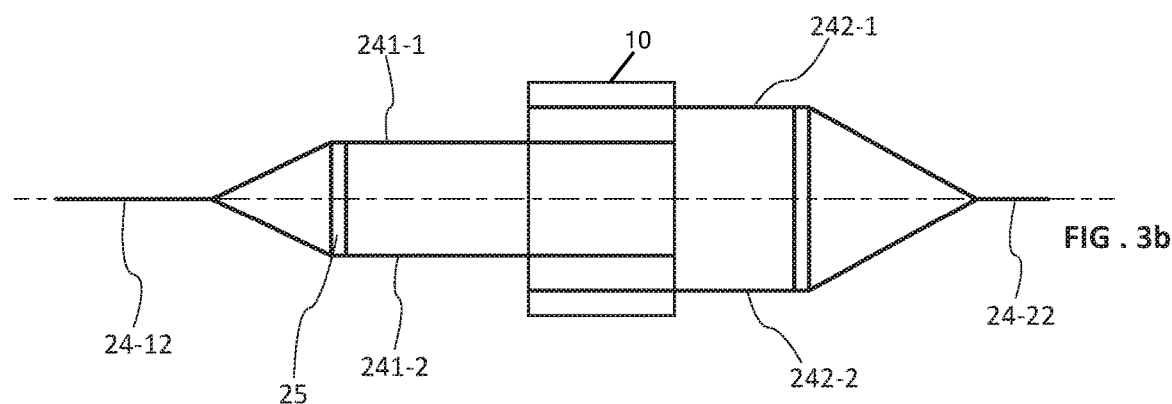
FIG. 3b: a bottom view of another variant of the connection means.

FIGS. 3a and 3b show this type of double support link.

Figure 6:
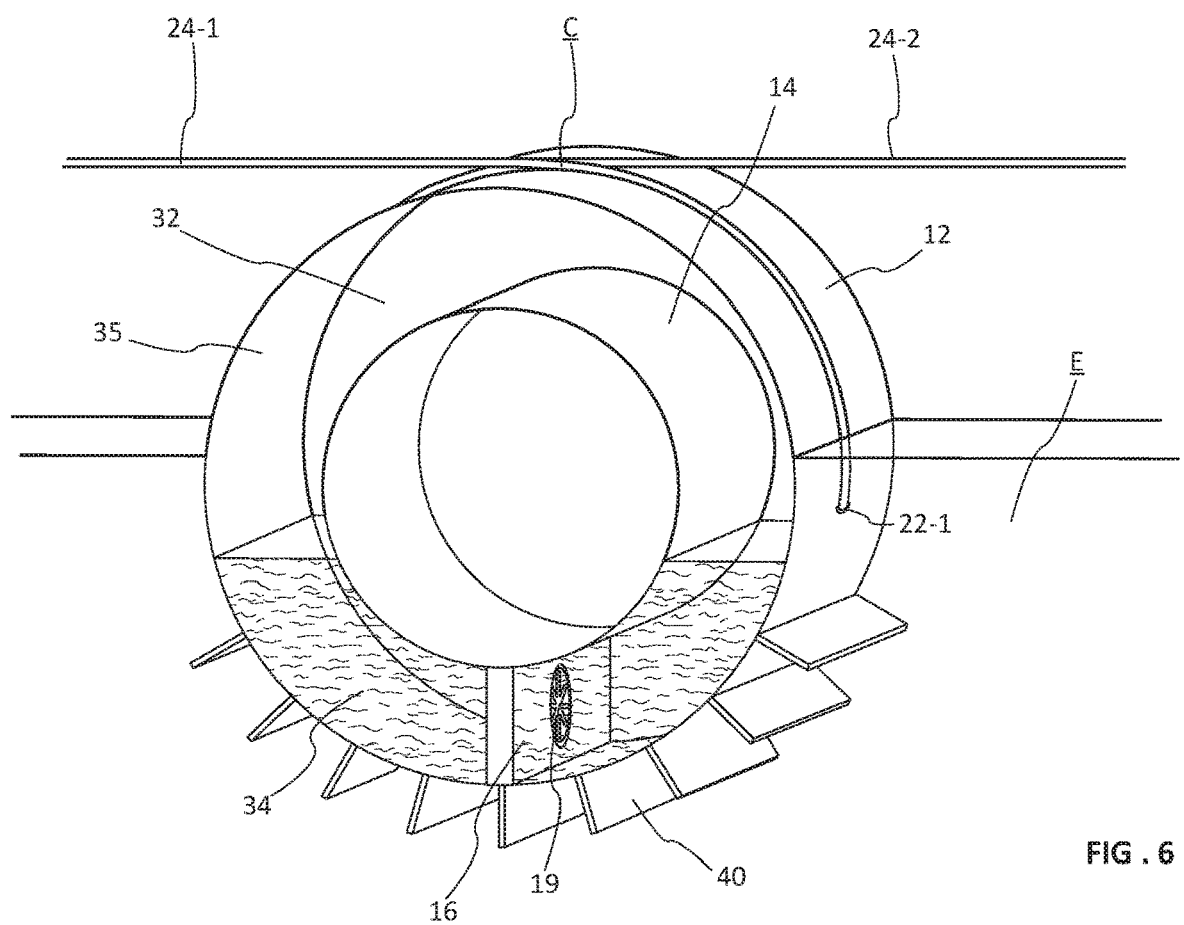
FIG. 6: an elevation view of the wave energy converter, seen in cross-section and provided with fins.

FIG. 6 is a perspective view of a wave energy converter similar to that of FIGS. 1 and 2, but in which the energy-production means 19, carried by the at least one support partition 16, are arranged in the lower part of the cylinder 10. In this arrangement, the support cables 24-1 and 24-2 intersect in the upper part of the cylinder 10. In this position, the support cables 24-1 and 24-2 are partially wound around the cylinder 10 and intersect at point C, located at the top of the cylinder 10, preferably on the wall. In addition, the outer wall 12 also bears fins 40, extended radially outward and expanded, along the width of the cylinder 10. The width of the cylinder 10 is considered to be the longest dimension of the cylinder 10, which extends along the X-axis.

The operation of the invention will now be described. The cylinder 10 is a watertight floating cylinder. The cylinder 10 is capable of containing a liquid fluid 34, which only partially fills the inner annular volume 32. The liquid fluid 34 can then move freely in the inner annular volume 32. When the cylinder 10 is in position, i.e., floating on the surface S of the water E, the cylinder 10 is vertically balanced by the ballast L, and the liquid fluid 34 is in the lower part of the cylinder 10 due to gravity.

At the same time, the support cables 24-1 and 24-2 connect the cylinder 10 to the floating elements 26-1 and 26-2, which may be buoys. The floating elements 26-1 and 26-2 are attached to the anchors 30-1 and 30-2. The anchors 30-1 and 30-2 have a fixed position on the seabed F and are connected to the floating elements 26-1 and 26-2 by the mooring cables 28-1 and 28-2. If the specification stipulates a single mooring cable 28-1 and 28-2 for holding the floating elements 26-1 and 26-2 in position, the floating elements 26-1 and 26-2 can be fixed to a plurality of anchors by a plurality of mooring cables in order to obtain more precise positioning of the floating elements 26-1 and 26-2 and therefore of the cylinder 10.

Therefore, the cylinder 10 can be directly attached to the anchors 30-1 and 30-2, but the cylinder 10 and the anchors 30-1 and 30-2 will be directly subjected to tensile stresses. The forces to which the cylinder 10 is subjected can be significant and require significant sizing of the anchors 30-1, 30-2 as well as the support cables 24-1 and 24-2. It is therefore preferred to use the floating elements 26-1 and 26-2 to avoid any direct stress.

In fact, the floating elements 26-1 and 26-2 make it possible to position the support cables 24-1 and 24-2 horizontally. The floating elements 26-1 and 26-2 thus lead to optimization of the design dimensions and to improved durability of the wave energy converter, which is designed to undergo millions of cycles annually.

Figure 4:
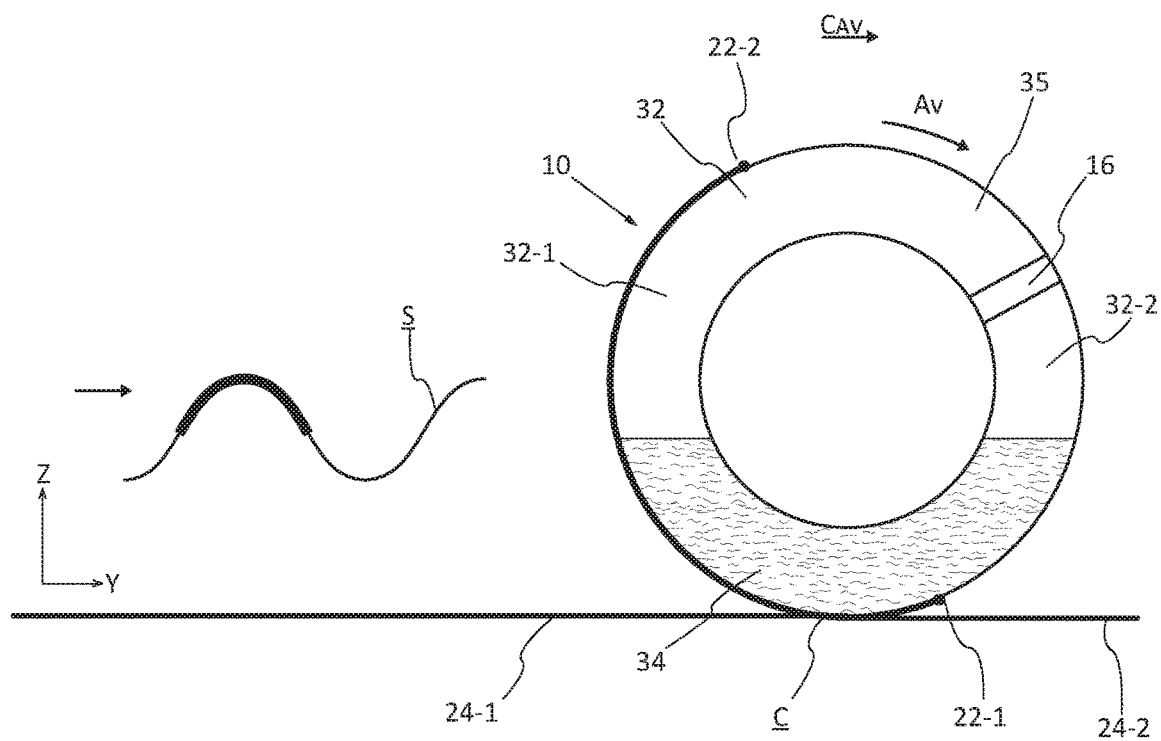
FIG. 4: an elevation view of the device subjected to surge in the direction of propagation of the swell, and a view of the positioning of the device on the swell.
Figure 5:
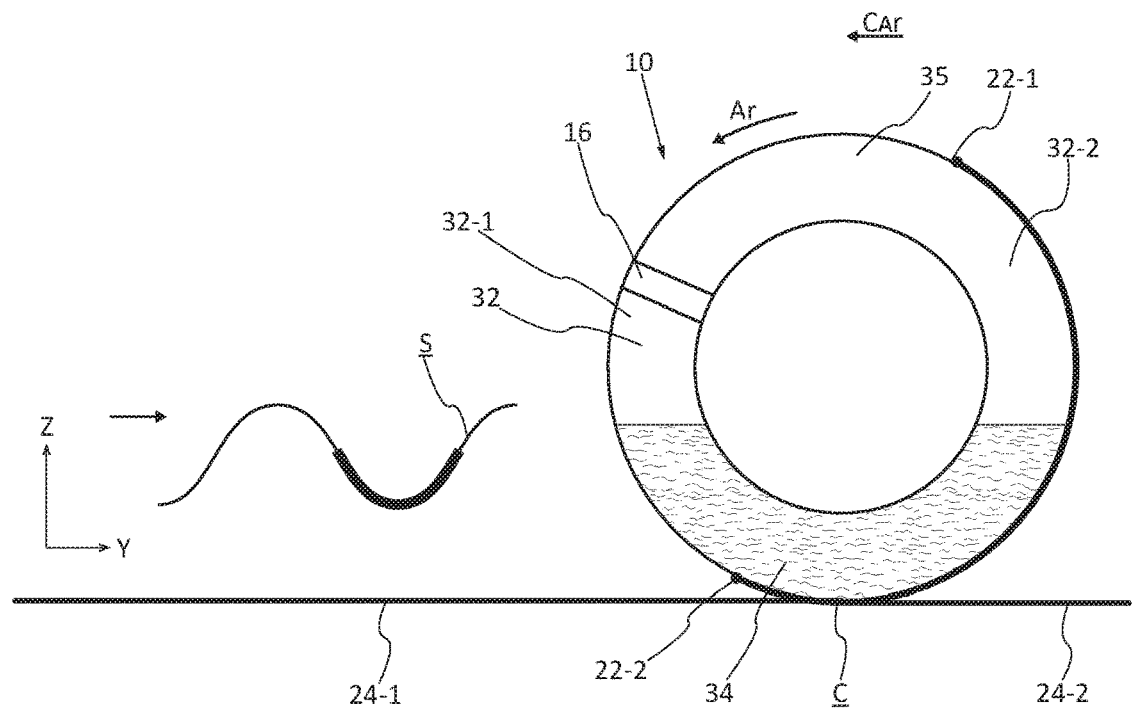
FIG. 5: an elevation view of the device subjected to surge in the direction opposite to the direction of propagation of the swell, and a view of the positioning of the device on the swell.

The swell movements experienced are considered to propagate along the Y-axis of the orthonormal frame of reference. These swell movements, as well as the induced positioning of the cylinder 10, are shown in FIGS. 4 and 5. FIGS. 4 and 5 show only the elements forming the cylinder 10 and the support cables 24-1 and 24-2. The floating elements 26-1 and 26-2 and the anchors 30-1 and 30-2 are not shown in FIGS. 4 and 5. The cylinder 10 is extended along the X-axis and, therefore, perpendicularly to the direction of propagation of the swell. When the wave energy converter is subjected to the movements of the swell, it is subjected to two distinct movements, very often simultaneously. The first movement to which it is subjected is a heave movement, which is similar to the variation in height to which it is subjected, along the Z-axis. The second movement is a surge movement, which is similar to a forward movement, along the Y-axis.

The premise of FIGS. 4 and 5 is that the swell propagates from left to right, along the Y-axis, perpendicularly to the width of the cylinder 10, and that the thickened portion of the swell shows the positioning of the cylinder 10 on the surface of water S. When the cylinder 10 is subjected to the surge movement, due to the propagation of the swell, it moves along a horizontal axis. In fact, as shown in FIG. 4, the cylinder 10 is subjected to the surge movement Cav when the cylinder 10 floats on the upper half of the swell, defined as a thickened portion, passing through the peak of the swell. However, the movement of the cylinder 10 is limited by the cable 24-1 which is connected to the fastener 22-1, placed on the outer wall of the cylinder 10. The support cable 24-1 then retains the cylinder 10 via the fastening point 22-1. However, if the fastening point 22-1 of the cylinder 10 is retained and the cylinder 10 continues to be subjected to the surge movement Cav due to the swell, the cylinder 10 then undergoes a rotation around the X-axis. Thus, the cable 24-1 stretches and unwinds and, simultaneously, the cable 24-2 is wound around cylinder 10. The movement of the swell to which the cylinder 10 is subjected therefore generates a rotation of the cylinder 10 in the forward direction Av along the X-axis.

FIG. 5 shows the surge movement Car to which the cylinder 10 is subjected when the cylinder 10 floats on the lower half of the swell, passing through the trough of the swell.

However, in this direction, the movement of the cylinder 10 is limited by the cable 24-2 which is connected to the fastener 22-2, placed on the outer wall of the cylinder 10. The support cable 24-1 then retains the cylinder 10 via the fastening point 22-2. However, if the fastening point 22-2 of the cylinder 10 is retained and the cylinder 10 continues to be subjected to the surge movement Car due to the swell, the cylinder 10 then undergoes a rotation around the X-axis. Thus, the cable 24-2 stretches and unwinds and, simultaneously, the cable 24-1 is wound around cylinder 10. The movement of the swell to which the cylinder 10 is subjected therefore generates a rotation of the cylinder 10 in the backward direction Ar along the X-axis.

When the cylinder 10 undergoes these previously described rotations, the liquid fluid 34 remains in the lower part of the cylinder 10, but the support partition 16 secured to the inner 10 and outer 12 walls forming the cylinder 10 passes from a vertical position, shown in FIG. 1, to a tilted position, shown in FIGS. 4 and 5. Thus, the support partition 16 which supports the current generator 19 comes closer to the liquid fluid 34 on one side and moves away from the fluid on the other side. The coming together of the support partition 16, comprising the current generator 19, and the liquid fluid 34 generates a compression of the gaseous fluid 35 and the distancing of the support partition 16 from the liquid fluid 34 generates a negative pressure on the gaseous fluid 35. More precisely, when the rotation takes place in the Av direction, as in FIG. 4, the chamber 32-2 is compressed and the chamber 32-1 is decompressed and when the rotation takes place in the Ar direction, the chamber 32-2 is decompressed and the chamber 32-1. The compressions and decompressions generated by the surge, and therefore the rotation of the cylinder 10, then induce circulation of the gaseous fluid 35 through the only possible passage for the gaseous fluid 35. The single passage is formed by the opening carrying the current generator 19, the current generator 19 is then driven by the circulation of the gaseous fluid 35 and produces electricity.

The energy production therefore takes place in the two surge directions of Cav and Car and therefore in the two directions of rotation Av and Ar.

In the case shown by FIG. 6, vanes 40 are added to the outside of the cylinder and are fixed radially to the outer wall 12 of the cylinder 10. The vanes have the role of increasing the surge effect by limiting sliding, and can also play the role of the previously described ballast L. The vanes 40 are placed on the lower part of the cylinder 10 while the support cables 24-1 and 24-2 are positioned on the upper part of the cylinder 10, it being possible for the positioning of the support cables 24-1 and 24-2 in the upper part and the vanes 40 to of course be used independently. FIG. 6 also provides another solution that can be adopted, namely the positioning of the support partition 16 which supports the current generator 19 placed in the lower part.

The wave energy converter then no longer functions by compression of the gaseous fluid 35 but by displacement of the liquid fluid 34, like an internal marine current turbine. Indeed, the current generator 19 is placed directly in the liquid fluid 34, in the lower part of the inner annular volume 32, which generates a movement of the generator relative to the liquid fluid 34. The generator 19 is therefore directly driven by the movements of the wall 16 into the liquid fluid 34.

In the wave energy converter shown in FIG. 1, it is also possible to couple a plurality of support partitions 16, for example a support partition 16 of a generator 19 as shown in FIG. 1 but with the addition of an additional support partition 19, immersed in the liquid fluid 34 as shown in FIG. 6. Such a device then makes it possible to combine the excess pressure effect and the immersion effect of the device described in FIG. 6. A plurality of support partitions 16 can also be placed in the chamber 32 and immersed in the liquid fluid 34 in order to increase the production of electrical energy. To absorb the stress movements transmitted to the floating elements 26-1 and 26-2 and to the anchors 30-1 and 30-2, the support cables 24-1 and 24-2 can be equipped with a braking element, positioned in the plane X, Z and fixed orthogonally to the support cables 24-1 and 24-2, as is the case, in particular, with floating anchors.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A floating wave energy converter for installation in an aquatic environment comprising a surface, water and a bed, the converter comprising:
   a single cylinder comprising energy-production means, and
   two separate first support cables, each first support cable secured at a first end to the single cylinder at spaced apart locations from the other, the first support cables having respective second ends connected to respective separate anchors,
   wherein the two separate first support cables intersect at a point located at a bottom of said cylinder or at a top of said cylinder.

2. The wave energy converter according to claim 1, wherein the two separate first support cables are secured to the cylinder via fasteners and the first support cables are connected to floating elements which are moored to the anchors via mooring cables.

3. A floating wave energy converter for installation in an aquatic environment comprising a surface, water and a bed, the converter comprising:
   a cylinder comprising energy-production means, and
   connection means connected to anchors,
   wherein the connection means intersect at a point located at a bottom of said cylinder or at a top of said cylinder,
   wherein the cylinder has an inner annular volume containing a liquid fluid and a gaseous fluid, the energy-production means and connection means, the energy-production means being placed in the inner annular volume and the connection means being connected to the anchors.

4. The wave energy converter according to claim 3, wherein the energy-production means are placed in at least one of the gaseous fluid or in the liquid fluid.

5. The wave energy converter according to claim 1, wherein the energy-production means comprise at least one current generator.

6. The wave energy converter according to claim 5, wherein the current generator is placed in a support partition.

7. The wave energy converter according to claim 2, wherein the two first support cables comprise two pairs of second support cables, which originate respectively from the first ends of the first support cables, the second support cables being secured to the single cylinder.

8. The wave energy converter according to claim 1, wherein the cylinder comprises a ballast.

9. A floating wave energy converter for installation in an aquatic environment comprising a surface, water and a bed, the converter comprising:
   a single cylinder comprising a generator, and
   two separate first support cables, each first support cable secured at a first end to said single cylinder at spaced apart locations from the other and connected to anchors at a respective second end,
   wherein the two first support cables intersect at a point located at a bottom of said cylinder or at a top of said cylinder,
   two separate first support cables, each first support cable secured at a first end to the single cylinder at spaced apart locations from the other, the first support cables having respective second ends connected to respective separate anchors,
   wherein the two separate first support cables intersect at a point located at a bottom of said cylinder or at a top of said cylinder.

10. The wave energy converter according to claim 1, wherein the two separate first support cables are each wrapped only partially around the cylinder.

11. The wave energy converter according to claim 1, wherein the single cylinder is arranged such that a central rotational axis is oriented horizontally.

12. The wave energy converter according to claim 1, wherein the two first support cables are secured to opposite sides of said single cylinder.

13. The wave energy converter according to claim 1, wherein the first support cables extend substantially horizontally away from the single cylinder.

14. The wave energy converter according to claim 9, wherein the two separate first support cables are each wrapped only partially around the cylinder.

15. The wave energy converter according to claim 9, wherein the single cylinder is arranged such that a central rotational axis is oriented horizontally.

16. The wave energy converter according to claim 9, wherein the two first support cables are secured to opposite sides of said single cylinder.

17. The wave energy converter according to claim 9, wherein the first support cables extend substantially horizontally away from the single cylinder.

* * * * *